(12) United States Patent
Baldassari et al.

(10) Patent No.: US 8,404,492 B2
(45) Date of Patent: Mar. 26, 2013

(54) METHOD AND MACHINE FOR MANIPULATING TOXIC SUBSTANCES

(75) Inventors: Daniele Baldassari, Sassoferrato (IT); Alferino Gabbarini, Cupramontana (IT); Paolo Giribona, Trieste (IT); Werner Rainer, Naturno (IT)

(73) Assignee: Health Robotics S.R.L. (IT)

( * ) Notice: Subject to any disclaimer, the term of this patent is extended or adjusted under 35 U.S.C. 154(b) by 633 days.

(21) Appl. No.: 12/516,149

(22) PCT Filed: Nov. 21, 2007

(86) PCT No.: PCT/IB2007/003577
§ 371 (c)(1),
(2), (4) Date: Aug. 26, 2009

(87) PCT Pub. No.: WO2008/062285
PCT Pub. Date: May 29, 2008

(65) Prior Publication Data
US 2010/0021348 A1    Jan. 28, 2010

(30) Foreign Application Priority Data

Nov. 22, 2006 (WO) .................... PCT/IT2006/00816
Dec. 6, 2006 (IT) .............................. BO2006A0840

(51) Int. Cl.
*G01N 1/10* (2006.01)
(52) U.S. Cl. ........ 436/180; 436/174; 422/501; 422/509; 422/512; 702/31
(58) Field of Classification Search .................. 436/180, 436/174; 422/501, 509, 512, 560; 702/31
See application file for complete search history.

(56) References Cited

U.S. PATENT DOCUMENTS 6,323,035 B1 * 11/2001 Kedar et al. ...................... 436/43
6,932,943 B1 * 8/2005 Cracauer et al. .............. 422/130
(Continued)

FOREIGN PATENT DOCUMENTS

DE 102 49 786 A1 5/2004
EP 1 314 452 A 5/2003
(Continued)

OTHER PUBLICATIONS

International Search Report prepared by the European Patent Office on Jun. 13, 2008 for International Application No. PCT/IB2007/003577; Applicant, Health Robotics S.R.L.

(Continued)

*Primary Examiner* — Jill Warden
*Assistant Examiner* — Dwayne K Handy
(74) *Attorney, Agent, or Firm* — Sheridan Ross PC (57) ABSTRACT

In a machine for manipulating toxic substances, an anthropomorphic robot transfers a container, which has a mouth closed by a cap made of perforable material, from a magazine for containers to a dosage station, set in which is a syringe provided with a needle, axially aligns the mouth with the needle, correcting the position of the mouth according to the position of the tip of the needle obtained from processing a number of images of the needle acquired from at least two distinct observation points, and finally approaches the container to the syringe in such a way that the needle perforates the cap and penetrates into the container to be able to inject or extract a substance into or out of the container.

18 Claims, 6 Drawing Sheets

U.S. PATENT DOCUMENTS

2002/0103500 A1    8/2002   Gildenberg
2008/0006653 A1*   1/2008   Dai et al. ................. 222/75

FOREIGN PATENT DOCUMENTS

| | | |
|---|---|---|
| JP | 02 158151 A | 6/1990 |
| JP | 11 014310 A | 1/1999 |
| WO | WO 2004/023783 A | 3/2004 |

OTHER PUBLICATIONS

International Preliminary Report on Patentability prepared by the European Patent Office on Sep. 19, 2008 for International Application No. PCT/IB2007/003577; Applicant, Health Robotics S.R.L.

* cited by examiner

METHOD AND MACHINE FOR MANIPULATING TOXIC SUBSTANCES

CROSS REFERENCE TO RELATED APPLICATIONS

This application is a national stage application under 35 U.S.C. 371 of PCT Application No. PCT/IB2007/003577 having an international filing date of 21 Nov. 2007, which designated the United States, which PCT application claimed the benefit of International Application No. PCT/IT2006/000816 filed 22 Nov. 2006 and Italian Application No. BO2006A000840 filed 6 Dec. 2006, the entire disclosure of each of which are hereby incorporated herein by reference.

TECHNICAL FIELD

The present invention relates to a method and to a machine for manipulating toxic substances.

In particular, the present invention finds advantageous, but non-exclusive, application, in a machine for automatic manipulation of toxic substances used for automatic preparation of cytostatic drugs, to which the following description will make explicit reference, without this implying any loss in generality.

BACKGROUND ART

There exist on the market machines for automatic manipulation of toxic substances, comprising: a magazine for containers, such as sacs, flasks and the like, each provided with a mouth closed by a respective cap made of perforable material and containing substances necessary for the preparation of drugs; a dosage station, present in which is at least one seat designed to withhold a corresponding syringe of a commercial type; and an anthropomorphic robot provided with a gripping head for picking up a container from the magazine, transferring it to the dosage station at a point corresponding to a syringe, and approaching it to the needle of the syringe in such a way that the needle, by perforating the cap, penetrates into the container to be able to inject therein or draw therefrom a substance. In addition, provided in these machines is an optical sensor of the photocell type for facilitating axial alignment of the mouth with the needle of the syringe.

The main drawback of such machines is a considerable difficulty in aligning containers having a mouth of small dimensions on account of the low level of precision with which the sensor detects the position of the tip of the needle. Very frequently, in fact, a terminal portion of the needle can be curved on account of production faults or damage caused by the operations of storage and/or transport, and a small dimension of the mouth frequently renders impossible proper alignment and, hence, insertion of the needle in the container.

DISCLOSURE OF INVENTION

The aim of the present invention is to provide a method and a machine for automatic manipulation of toxic substances in order to prepare cytostatic drugs, as well as a computer program product implementing said method, said method and machine being free from the drawbacks described above and, at the same time, being easy and inexpensive to provide.

In accordance with the present invention, a method and a machine for manipulating toxic substances, as well as a computer program product implementing said method, are provided according to what is specified in the annexed claims.

BRIEF DESCRIPTION OF THE DRAWINGS

The present invention will now be described with reference to the annexed drawings, which illustrate a non-limiting example of embodiment thereof and in which.

BEST MODE FOR CARRYING OUT THE INVENTION

Figure 1:
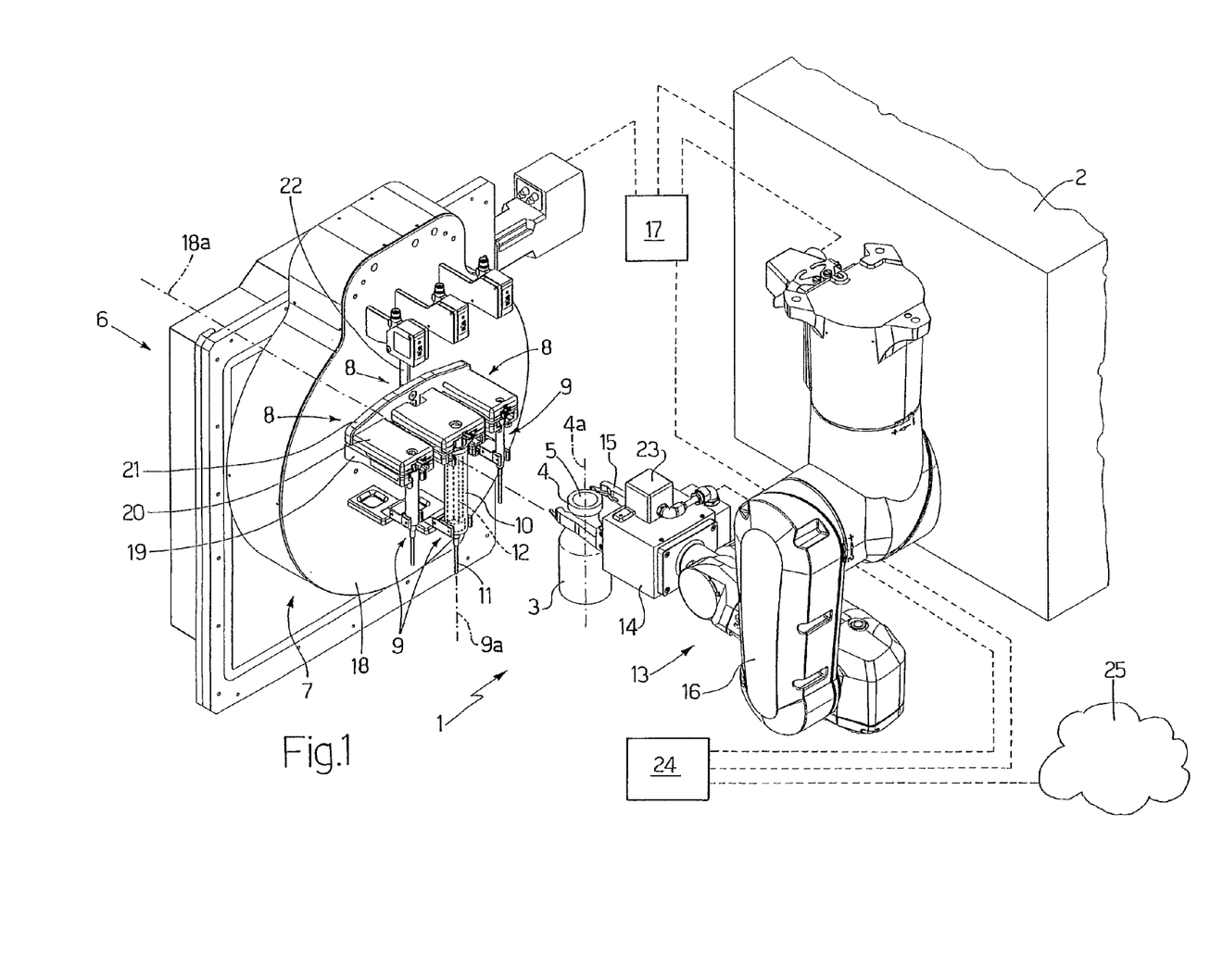
FIG. 1 is a schematic illustration of the machine for manipulating toxic substances built according to the present invention.

In FIG. 1, designated as a whole by 1 is a machine for manipulating toxic substances comprising: a magazine 2 (schematically illustrated by a parallelepiped) for containers 3, such as sacs, flasks, and the like, for toxic and non-toxic substances, necessary for the preparation of drugs, each of said containers being provided with a mouth 4 having an axis 4a and closed by a respective cap 5 made of perforable material; a dosage station 6, set in which is a dosage assembly 7 provided with three seats 8 designed to withhold as many syringes 9 of a commercial type of various format, i.e., of the type comprising a body 10 having a cylindrical shape, a needle 11 fitted at one end of the body 10, and a plunger 12 that slides axially within the body 10; and an anthropomorphic robot 13, which is provided with a gripping head 14 comprising a gripper member 15 designed to grip the containers 3, and an articulated arm 16 with six degrees of freedom, designed to support the head 14 to be able to transfer a container 3 from the magazine 2 to the dosage station 6 at a point corresponding to a syringe 9 and approach the container 3 itself to the needle 11 of said syringe 9 in such a way that the needle 11, by perforating the cap 5, penetrates into the container 3.

The machine 1 is, moreover, provided with a control unit 17 for controlling actuation of the robot 13, of the dosage assembly 7, and of members (not illustrated) for moving the magazine 2. The dosage assembly 7 and the robot 13 are housed in a sterile compartment (not illustrated), communicating with the magazine 2, to prevent germs or micro-organisms from contaminating the drugs during their preparation.

The dosage assembly 7 comprises a platform 18 rotating about a horizontal axis 18a, there being mounted on said platform 18 three seats 8 for syringes. Each seat 8 comprises a gripping element 19 fixed with respect to the platform 18 for withholding the body 10 of the syringe 9 with a longitudinal axis 9a of the syringe 9 substantially vertical, and an actuation element 20 for extracting the plunger 12 so as to draw an amount of substance into the syringe 9 or to press the plunger 12 in order to inject an amount of substance into the container 3. The actuation elements 20 are rigidly connected to one another by a bar 21 designed to move vertically along a rectilinear guide 22 made on the platform 18. Rotation of the platform 18 enables change of orientation of the syringes 9 between a position where the substance is drawn in, in which the tip of the needle 11 faces upwards, and a position (illustrated in FIG. 1) of injection of the substance ??? into the container, in which the tip of the needle 11 faces downwards.

The machine moreover comprises: a fixed-focus black-and-white analogical telecamera 23, which is provided with a video-composite output (not illustrated) and is mounted in a fixed way on the head 14; and a computer 24, for example of the PC-architecture type, connected to a hospital computer system 25 for exchanging data on the preparation of drugs with the telecamera 23 for acquiring the images detected thereby and with the control unit 17 for controlling the members of the machine 1 that are described above.

Figure 2:
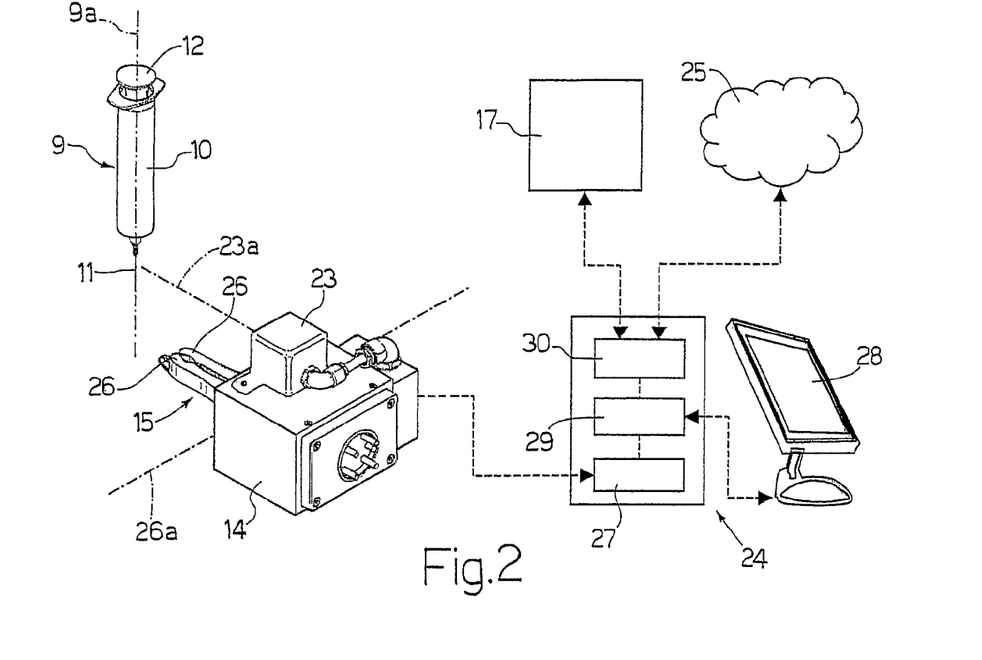
FIG. 2 illustrates a part of the machine of FIG. 1.

With reference to FIG. 2, the gripper member 15 of the head 14 comprises two jaws 26 mobile along an axis of sliding 26a with a movement of mutual approach and recession for gripping and, respectively, releasing the container 3. The telecamera 23 is mounted on the head 14 with an optical axis 23a of its own perpendicular to a plane on which the axis of sliding 26a lies.

The computer 24 comprises: an image-acquisition card 27, which is of the type known as "framegrabber" and has a video-composite input (not illustrated) connected to the video-composite output of the telecamera 23; an interface unit 28, for example a touch screen, to enable an operator to interact with the machine 1; a processing unit 29, which is designed to process the data on the drugs and the images acquired in order to determine the commands to be sent to the control unit 17; and a communication unit 30 connected to the control unit 17 and to the hospital computer system 25.

Loaded into the processing unit 29 is a control program designed for implementing, when run on the processing unit 29 itself, the method for manipulating toxic substances according to the present invention.

For reasons of simplicity of description, in what follows reference will be made to an example of manipulation consisting in an injection of a desired amount of substance from a syringe 9 into a container 3, said syringe 9 being already set in the corresponding seat 8 with said substance inside the body 10.

In said example, the method envisages control of the arm 16 of the robot 13 for picking up the container 3 from the magazine 2 and transferring it into the dosage station 6, and, substantially at the same time, the platform 18 is rotated to bring the syringe 9 into the injection position, i.e., with the needle 11 facing downwards. At this point, the arm 16 positions the container 3 underneath the needle 11 with the mouth 4 facing upwards. It axially aligns the mouth 4 of the container 3 with the needle 11, i.e., it brings the axis 4a of the mouth 4 substantially to coincide with an axis of the needle 11. Then, it raises the container 3 longitudinally towards the needle 11 in such a way that a considerable part of the needle 11, after perforating the cap 5, penetrates into the container 3. Finally, the actuation element 20 is brought down in order to press the plunger 12 into the body 10 of the syringe 9 just enough to inject the desired amount of substance into the container 3.

According to the present invention, the step of axial alignment of the mouth 4 of the container 3 with the needle 11 envisages: acquiring two images of the needle 11 from two respective distinct observation points; processing said images to determine the position of the tip of the needle 11 and the inclination of the needle 11, i.e., the inclination of an axis of the needle 11 with respect to the axis 9a of the syringe 9; and actuating the arm 16 of the robot 13 so as to correct the position of the head 14, and hence of the container 3, according to the position of the tip of the needle 11 and of the inclination of the needle 11. In particular, processing of the two images basically consists in determining, for each of the images, the spatial co-ordinates of two points along the needle 11 and in calculating the position of the tip of the needle 11 and the inclination of the needle 11 as a function of said co-ordinates on the basis of the known principle of optical triangulation.

Figure 3:
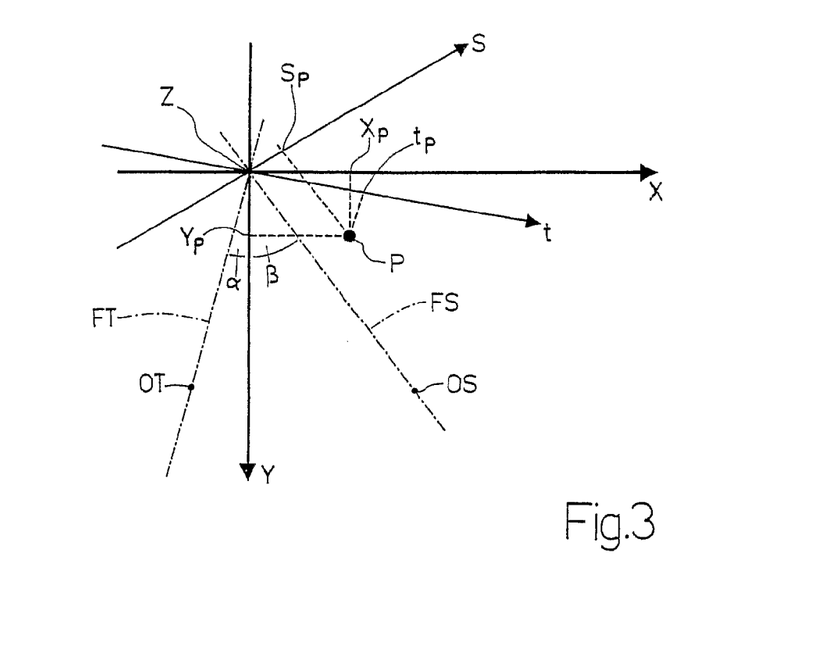
FIG. 3 illustrates a syringe represented in a Cartesian reference system and in another non-cartesian reference system.

With reference to FIG. 3, designated by P is a point representing a section of the needle 11 with respect to a Cartesian reference system with three axes X, Y, Z, in which the axis Z is perpendicular to the plane of the drawing, and the axis 9a of the syringe 9 is parallel to the axis Z. In FIG. 3, designated by FT and FS are two distinct directions of framing orthogonal to the axis Z. Defined on the directions of framing FT and FS are two respective observation points OT and OS set substantially at the same distance from the point P. In order to acquire an image from each of the observation points OT and OS, the arm 16 of the robot 13 displaces and rotates, about the axis Z, the head 14 so as to position the telecamera 23 first in the observation point OT with the optical axis 23a parallel to the direction of framing FT and then in the observation point OS with the optical axis parallel to the direction of framing FS.

It should be noted that optical triangulation would yield optimal results if the directions of framing FT and FS were orthogonal to one another. However, in order to contain the extent of the movements of the arm 16 of the robot 13 in such a way as to reduce the external overall dimensions of the sterile compartment, the directions of framing FT and FS form between them an acute angle. In particular, with reference once again to FIG. 3, the directions of framing FT and FS form with the axis Y two respective angles a and β and are orthogonal to two respective planes of framing, each defined by the axis Z and by a respective axis t, s orthogonal to the axis Z. The value of the angles a and β is such that their sum (a+β) is less than 90°, and in particular less than or equal to 40°. The co-ordinates of the point P with respect to the Cartesian axes X and Y are designated by Xp and Yp, and the co-ordinates of the point P with respect to the axes t and s are designated by tp and sp. The co-ordinates with respect to the axes t and s can, in any case, be referred to the Cartesian reference system by means of the following trigonometric transformations:

$$Y = \left(\frac{t}{\cos(\alpha)} - \frac{s}{\cos(\beta)}\right) \cdot \frac{1}{\tan(\alpha) + \tan(\beta)}; \quad (1)$$

$$X = Y \cdot \tan(\beta) + \frac{s}{\cos(\beta)}. \quad (2)$$

In order to determine the inclination of the needle 11, it is necessary to determine at least two points, which will be designated hereinafter by P1 and P2, through which the needle 11 passes. Once the Cartesian co-ordinates X1, Y1, Z1 of the point P1 and the Cartesian co-ordinates X2, Y2, Z2 of the point P2 are known, the inclination is given by the following trigonometric relations:

$$RX = \arctan\left(\frac{Y1 - Y2}{Z1 - Z2}\right), \quad (3)$$

$$RY = \arctan\left(\frac{X1 - X2}{Z1 - Z2}\right), \quad (4)$$

where RX and RY are the angles formed with the axes X and Y, respectively, by projections on the planes X-Z and Y-Z of a portion of needle 11 comprised between the points P1 and P2.

Figure 4:
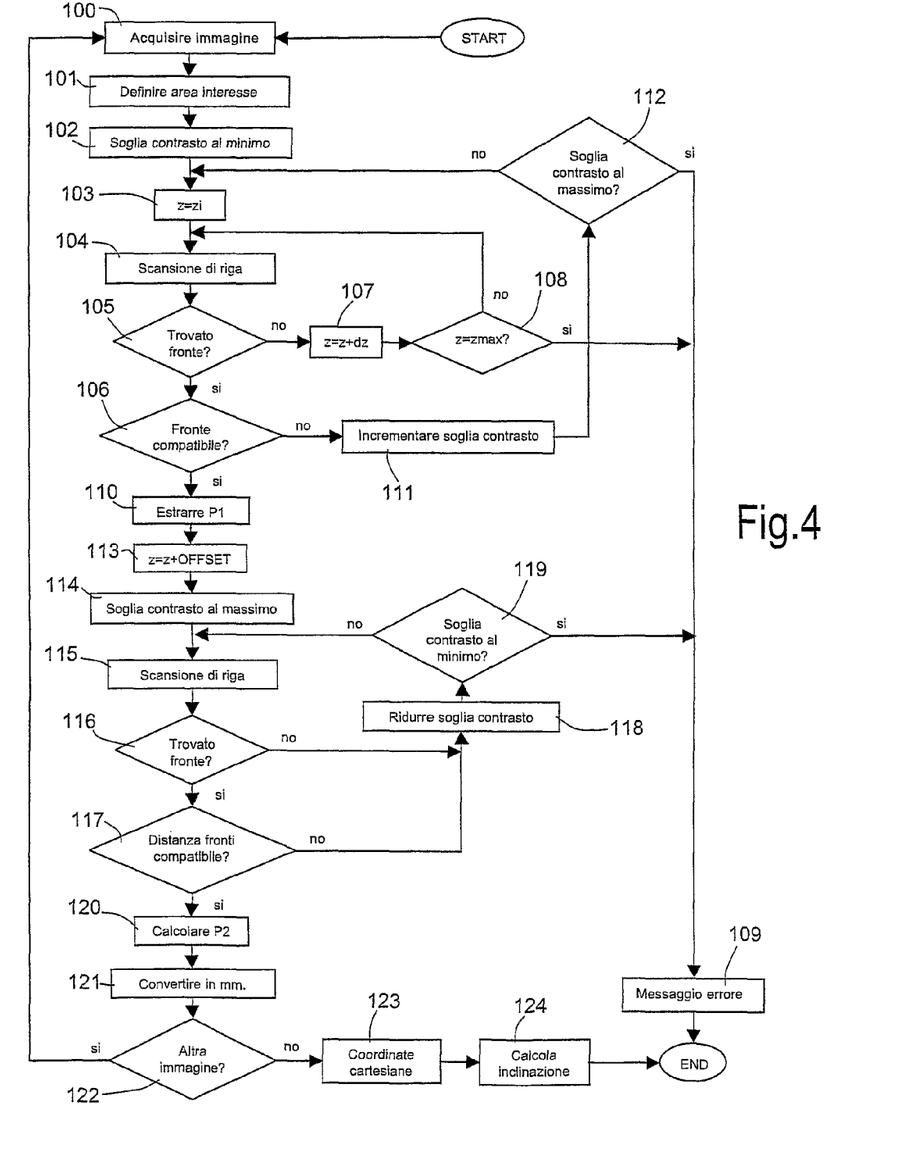
FIG. 4 is a flowchart of the method for manipulating toxic substances in accordance with the present invention and implemented in the machine of FIG. 1.
Figure 5:
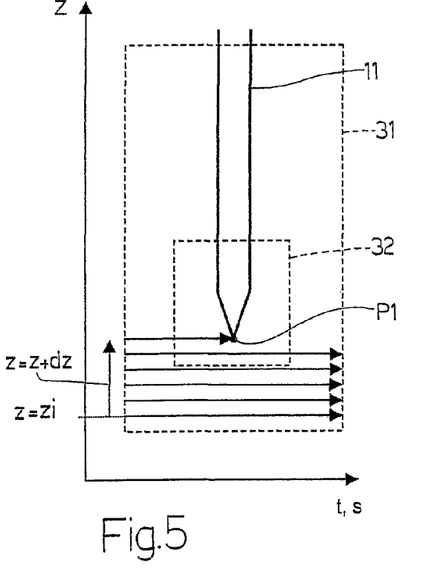
FIGS. 5 to 7 are schematic illustrations of some steps of the flowchart of FIG. 4.
Figure 6:
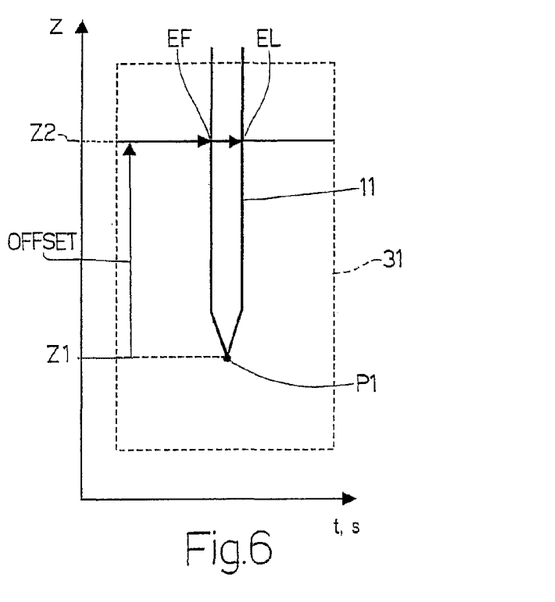
Figure 7:
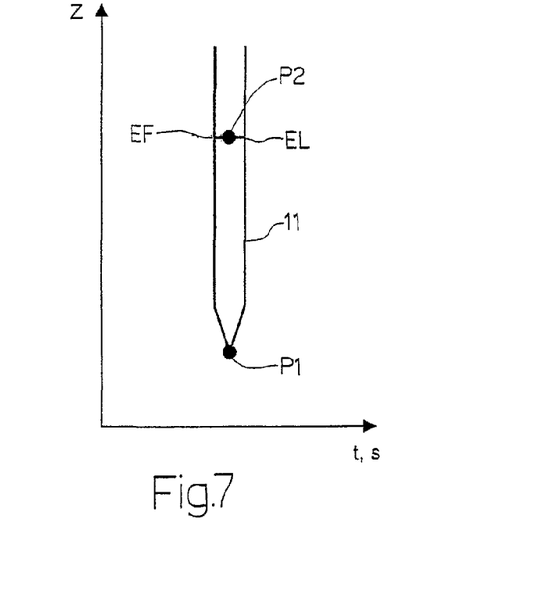

FIG. 4 illustrates a flowchart that describes processing of the two images acquired from the respective observation points OT and OS in order to determine the position of the tip of the needle 11 and the inclination of the needle 11. The subsequent FIGS. 5, 6 and 7 are schematic illustrations of some steps of said processing. Image processing is implemented in a portion of said control program written in a programming language known as LabVIEW® and compiled, in the Microsoft® Windows® environment, as data-link library (DLL).

With reference to FIG. 4, via the image-acquisition card 27, the image of the needle 11 is first acquired in a digital format (block 100), after which an area of interest 31 of the image (FIG. 5), i.e., a rectangular portion of the image, is defined, within which area of interest 31 the needle 11 will be sought (block 101), and an image-contrast threshold is adjusted to a minimum value, beyond which it is possible to detect the needle (block 102). The area of interest 31 is defined by carrying out filtering operations of a known type on the image of the needle 11.

The area of interest 31 is examined row by row starting from the bottom (z=zi, FIG. 5) (block 103), and on each row in question a scan is made in order to seek an edge using a function, known as "IMAQ Edge Tool", provided with a library, known as IMAQ Vision, for the LabVIEW® language (block 104). In the case where an edge is found (output YES from block 105), then a check is made to assess whether said edge is compatible with the tip of the needle 11, i.e., whether said edge falls within a compatibility area 32 (FIG. 5) defined as a given rectangular portion of the area of interest 31 in which the tip of the needle 11 is expected to be located (block 106). If the edge is not found, the next row is examined (z=z+dz, FIG. 5) (block 107). In the case where the maximum number of rows (zmax) is reached without any edge having been found (output YES from block 108), then an error message is produced of the type "needle not recognizable" (block 109).

If the edge found is compatible (output YES from block 106), then the co-ordinates of said edge are extracted from the image, said edge corresponding to the first point P1 sought and defining the tip of the needle 11 (FIG. 5) (block 110); otherwise, the contrast threshold (block 111) is increased by a given amount in order to adapt the search for the needle 11 to the quality of the image and the examination of the area of interest is repeated starting from the first row (block 103). In the case where the maximum value of the contrast threshold is reached without any edge having been found in the compatibility area (output YES from block 112), then an error message is produced of the type "needle in an unexpected position" (block 109).

After the co-ordinates of the point P1, which represents the tip of the needle 11, have been determined, the second point P2 through which the needle 11 passes is determined.

In particular, examination passes to a row that is distant from the row of the point P1 by a pre-set number OFFSET of rows (FIG. 6) (block 113), the contrast threshold is adjusted to a maximum value (block 114), and the scan is made of the row in question to seek edge using the "IMAQ Edge Tool" function mentioned above (block 115).

Whenever an edge is found (output YES from block 116), a check is made to assess whether the distance between a first edge EF and a last edge EL found in the row in question is compatible with the transverse dimensions of the needle 11, i.e., if said distance is equal, within a given tolerance, to the diameter of the needle 11 (block 117). In the case where no edge is found (output NO from block 116) or else the distance between the edges EF and EL is not compatible with the dimensions of the needle 11 (output NO from block 117), then the contrast threshold is reduced by a given amount (block 118) and the scan of the row in question is repeated (block 115). In the case where the minimum value of the contrast threshold is reached without any edge having been found or else without the distance between the edges EF and EL being compatible with the dimensions of the needle 11 (output YES from block 119), then an error message is produced of the type "needle not recognizable" (block 109).

If the distance between the edges EF and EL found in the row in question is compatible with the dimensions of the needle 11 (output YES from block 117), then the point P2 is calculated as intermediate point between the points identified by the edges EF and EL (FIG. 7) (block 120).

It should be noted that the co-ordinates of the points P1 and P2 supplied by blocks 110 and 120 are expressed in pixels. Hence, the determination of the point P2 is followed by an operation of transformation of the co-ordinates of the points P1 and P2 from pixels to millimeters (block 121) by applying transformation coefficients obtained during a step of calibration that will be described hereinafter.

The algorithm defined by blocks 100 to 121 is repeated for each of the two images acquired (block 122). In this way, obtained from the image acquired from the observation point OT are the co-ordinates of the points P1 and P2 with respect to the axes t and Z, and obtained from the image acquired from observation point OS are the co-ordinates with respect to the axes s and Z. As a whole, the co-ordinates t1, s1, Z1 for the point P1 and the co-ordinates t2, s2, Z2 for the point P2 are obtained.

At this point, expressions (1) and (2) are applied to obtain the Cartesian co-ordinates X1 and Y1 as a function of the co-ordinates s1 and t1, and the Cartesian co-ordinates X2 and Y2 as a function of the co-ordinates s2 and t2 (block 123), and expressions (3) and (4) are applied to calculate the inclination of the needle 11 as a function of the co-ordinates of the two points P1 and P2 (block 124).

As regards the calibration step mentioned previously, it is performed prior to any preparation of drugs and envisages acquiring three further images of the needle 11 of a syringe 9 fixed in a standard position, for example, housed in a corresponding seat 8 with the tip of the needle 11 facing downwards. A first one of said further images is recorded after positioning, via the arm 16 of the robot 13, the telecamera 23 in one of the observation points, for example in the point OT, with the optical axis 23a parallel to the corresponding direction of framing FT. A second image and a third image are acquired after displacing, once again by means of the arm 16, the telecamera 23 a first time only along the axis t and a second time only along the axis Z by respective known amounts expressed in millimeters, maintaining the distance from the axis 9a substantially constant. By exploiting the algorithm described previously, the displacement in pixels of the needle 11 in the second image and in the third image with respect to the position of the needle 11 recorded in the first image is calculated, and, by calculating the ratio between the displacements in millimeters and in pixels, two transformation coefficients from pixels to millimeters are obtained.

Figure 8:
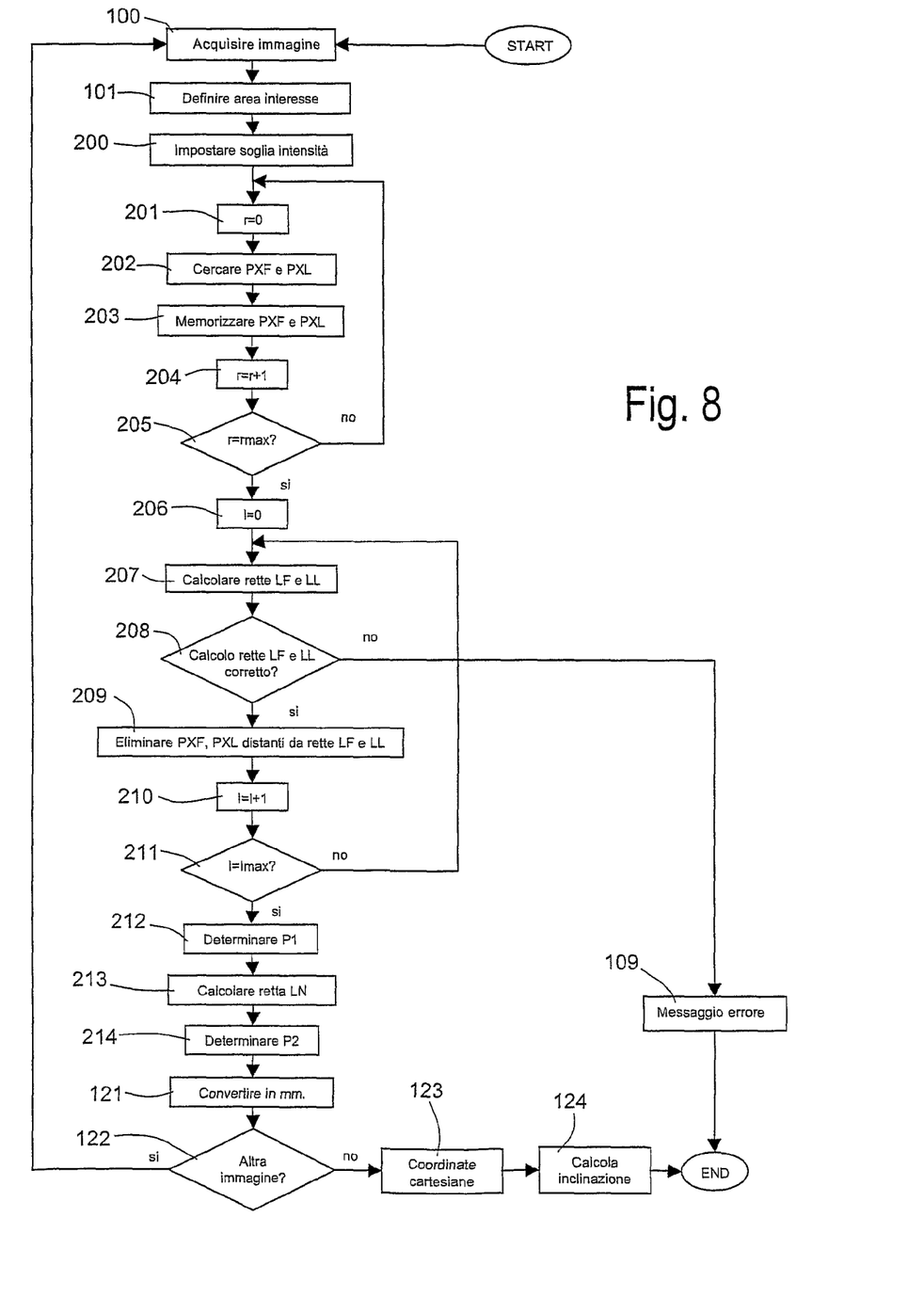
FIG. 8 is a flowchart of the method for manipulating toxic substances according to a further embodiment of the present invention.
Figure 9:
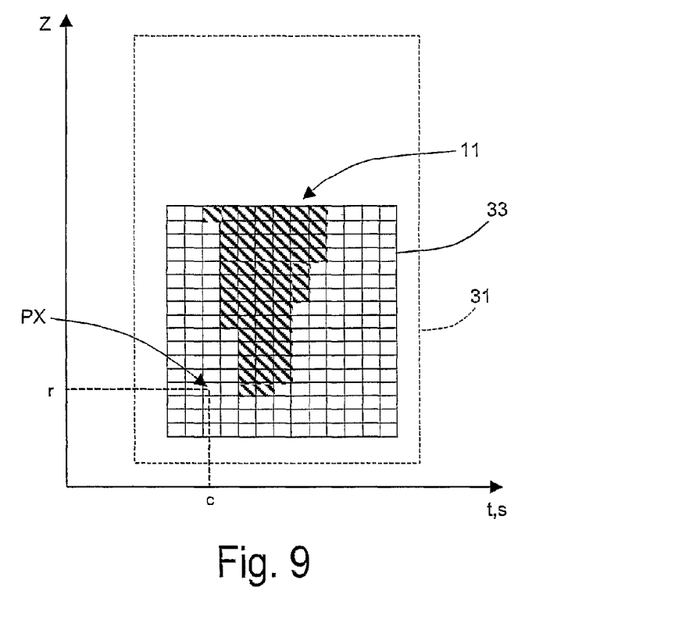
FIGS. 9 to 11 are schematic illustrations of some steps of the flowchart of FIG. 8.
Figure 10:
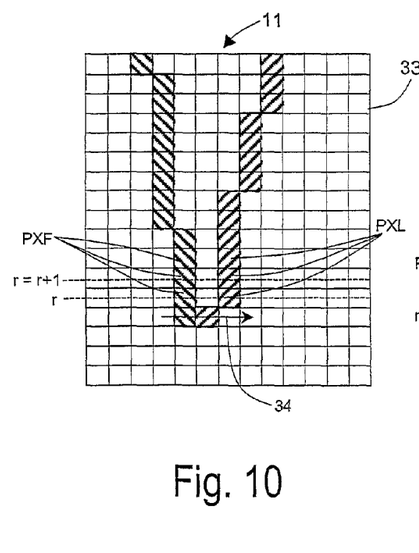
Figure 11:
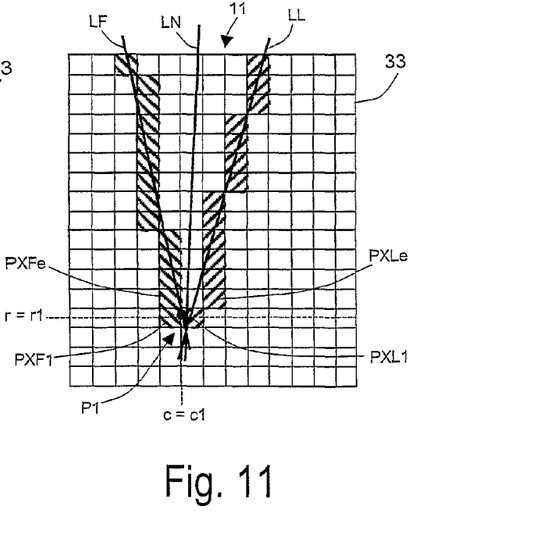

According to a further embodiment of the present invention, illustrated in FIG. 8, which shows a new flowchart, in which, however, some blocks that correspond to the ones already described are designated by the same numbers as those used in FIG. 4, and again illustrated in FIGS. 9 to 11, where elements corresponding to the ones described are designated by the same reference numbers as those used in FIGS. 5 to 7, respectively, the points P1 and P2 sought are determined by processing in a different way the area of interest 31 of each digital image of the needle 11.

Each digital image of the needle 11 is constituted by a matrix of pixels obtained according to known digital acquisition techniques. Consequently, the corresponding area of interest 31 is constituted by a sub-matrix of said matrix of pixels.

FIG. 9 illustrates, in a simplified way, a portion of image 33 of the area of interest 31, in which the tip of the needle 11 may be noted. The portion of image 33 is shown divided into a plurality of pixels. Those corresponding to the tip of the needle 11 are represented with an oblique line. The position of a generic pixel PX in the compatibility area 32 is identified by a pair of co-ordinates in pixels, the first one of which is expressed with respect to the axis Z and is designated by r and the second one of which is expressed with respect to the axis t, s and is designated by c. In practice, the co-ordinate r identifies a row of pixels, and the co-ordinate c identifies a column of pixels.

In FIGS. 10 and 11, which illustrates the same portion of image 33 of FIG. 9 during some processing steps of the flowchart of FIG. 8, shown for greater clarity with an oblique line are only some of the pixels of the tip of the needle 11.

With reference to FIG. 8, after acquisition of the image of the needle 11 and definition of the corresponding area of interest 31 (blocks 100 and 101), a pixel intensity threshold is set to a pre-set value (block 200). Optionally, the value of the intensity threshold is adjustable by the operator.

The area of interest 31 is then examined by rows of pixels starting from the lowest row of pixels (r=0) (block 201). Within each row of pixels, identified by the generic co-ordinate r, there are sought the first pixel PXF and the last pixel PXL (FIG. 10), with respect to a pre-set direction of search 34 (FIG. 10) along the row of pixels, which have an intensity higher than the intensity threshold (block 202). The co-ordinates c, r of the pixel PXF are stored in a corresponding position of a first pixel vector VF, and the co-ordinates of the pixel PXL are stored in a corresponding position of a second pixel vector VL (block 203). Then, the next row of pixels (r=r+1) is examined (block 204) so as to repeat, for each row of pixels, the search for the pixels PXF and PXL and storage thereof in the corresponding vectors VF and VL until a maximum number of rows (r=rmax) of the area of interest 31 is reached (block 205). The two pixel vectors VF and VL are implemented in an internal memory (not illustrated) of the processing unit 29 (FIG. 2).

At this point, a cycle of linearization is carried out to determine, according to the two vectors VF and VL, two straight lines that enable precise identification of the position of the tip of the needle 11 and the inclination of the needle 11.

In particular, with reference to FIGS. 8 and 11, after initialization at zero of a cycle variable I (block 206), the cycle envisages, first of all, calculation of a first straight line, designated by LF in FIG. 11, on the basis of a linear interpolation of the co-ordinates stored in the vector VF, and a second straight line, designated by LL in FIG. 11, on the basis of a linear interpolation of the co-ordinates stored in the other vector VL (block 207). The straight line LF is expressed by the following equation:

$$c = MF \cdot r + QF, \quad (5)$$

and the straight line LL is expressed by the following equation:

$$c = ML \cdot r + QL, \quad (6)$$

where MF and ML are the angular coefficients, and QF and QL are the offsets of the respective straight lines LF and LL.

Then, a check is made to verify whether the calculation of the straight lines LF and LL has been made correctly on the basis of whether two conditions are met or not (block 208), a first one of which is made on the angular coefficients MF and ML, i.e., on whether the absolute value of their difference is smaller than a pre-set limit difference DM, $$|MF - ML| < DM, \quad (7)$$

and the second one of which is made on the offsets QF and QL, i.e., on whether their difference is comprised between a pre-set minimum difference DQmin and a pre-set maximum difference Dqmax, $$DQ\min < (QF - QL) < DQ\max. \quad (8)$$

The limit difference DM is preferably equal to 0.2. The minimum difference is preferably equal to 10, and the maximum difference DQmax is preferably equal to 200 pixels.

If at least one of the two conditions (7) and (8) is not met (output NO from block 208), then an error message is produced (block 109) and processing terminates. Otherwise, i.e., if the conditions (7) and (8) are both met (output YES from block 208), the program proceeds according to what is described hereinafter.

From the vectors VF and VL there are eliminated the pairs of pixels PXF, PXL that fall outside a shape of the tip of the needle 11 defined by a portion of plane comprised between the straight lines LF and LL and that are distant, along the respective rows of pixels, from the straight lines LF and LL themselves by a pre-set amount (block 209). In particular, the pairs of pixels PXF, PXL to be eliminated must satisfy at least one of the following two conditions. A first one of said conditions is that the co-ordinate c of the pixel PXF, designated by c_PXF, increased by a pre-set deviation S is smaller than a co-ordinate c_LF given by Equation (5) corresponding to the co-ordinate r of the pixel PXF itself, i.e., $$c\_PXF + S < c\_LF, \quad (9)$$

The other condition is that the co-ordinate c of the pixel PXL, hereinafter designated by c_PXL, decreased by the deviation S is greater than a co-ordinate c_LL given by Equation (6) corresponding to the co-ordinate r of the pixel PXL itself, i.e., $$c\_PXL - S < c\_LL. \quad (10)$$

In FIG. 11, designated by PXFe, PXLe is one of the pairs of pixels to eliminated.

The cycle variable I is, at this point, incremented (I=I+1) (block 210), and the calculation of the straight lines LF and LL is repeated as a function of the updated vectors VF and VL until a maximum number of repetitions Imax is reached, which is preferably equal to 3 or 4 (block 211).

The first point P1 sought is determined as a function of a pair of pixels PXF1, PXL1, which, from among all the pairs of pixels PXF, PXL stored in the vectors VF and VL, has the co-ordinate r of lowest value, hereinafter designated by r1, and that remains substantially within the shape defined by the straight lines LF and FF (block 212). In particular, the pair of pixels PXF1, PXL1 selected must satisfy two further conditions: the distance between the corresponding co-ordinates c_PXF and C_PXL is less than a pre-set distance DPX, namely $$|c\_PXF - c\_PXL| < DPX; \quad (11)$$

and a mean value of the co-ordinates c_PXF and c_PXL, hereinafter designated by c1, is comprised, but for a tolerance TPX, between the straight lines LF and LL corresponding to the co-ordinates r1, namely $$c\_LF < |c1 - TPX| < c\_LL. \tag{12}$$

The co-ordinates in pixels c1 and r1 thus determined identify the point P1 on the plane of the image acquired.

In order to determine the second point P2 sought, a third straight line LN is calculated (FIG. 11) as vector sum of the directions identified by the two straight lines LF and LL (block 213). The direction identified by the straight line LN represents the inclination of the needle 11 with respect to the axis 9a in the plane of the portion of image 33. The vector sum consists in calculating a mean angular coefficient Mm as average of the two angular coefficients MF and ML and a mean offset Qm as average between the offsets QF and QL. The straight line LN is, hence, defined by the mean angular coefficient Mm and by the mean offset Qm.

The co-ordinates in pixels that identify, on the plane of the image acquired, the second point P2 sought are given by the intersection of the straight line LN with a row of pixels set at a distance from the row r1 equal to the number of rows OFFSET (block 214) and hence identified with the co-ordinate:

$$r2 = r1 + \text{OFFSET}. \tag{13}$$

This step is obtained via simple trigonometric calculations. The row of pixels with the co-ordinate r2 is not illustrated in FIG. 11 in so far as the point P2 is to be identified as far as possible away from the point P1, in particular at the upper limit of the area of interest 31 (r=rmax), and hence outside of the portion of image 33 of the example illustrated.

In a way similar to the flowchart of FIG. 4, the co-ordinates in pixels of the points P1 and P2 are converted into co-ordinates in millimeters (block 121), and the algorithm defined by blocks 100, 121, 200 to 214, and 121 is repeated for each of the two images acquired (block 122), and the inclination of the needle 11 in the Cartesian space is calculated as a function of the Cartesian co-ordinates of P1 and P2 (blocks 123 and 124).

From the above description, it is clear that the axial alignment of the mouth 4 of the container 3 with the needle 11 of the syringe 9 in accordance with the present invention is identically applicable in any position of the syringe 9, for example, in the position where it is drawing in the substance, in which the syringe 9 is oriented with the tip of the needle 11 facing upwards. In this situation, in fact, the arm 16 of the robot 13 is controlled for displacing and rotating the head 14 so as to turn the container 3 upside down with the mouth 4 facing downwards and set above the tip of the needle 11, and at the same time turning also the telecamera 23 mounted on the head 14 upside down. Consequently, the images acquired via the telecamera 23 represent the needle 11 once again with the tip facing the bottom part of the image.

The main advantage of the method and of the machine 1 for manipulating toxic substances described above is that of obtaining a precise axial alignment between the mouth 4 of the container 3 and the needle 11 of the syringe 9 such as to enable insertion of the needle 11 also through mouths 4 with extremely small dimensions. In fact, it is possible to achieve an error of alignment of less than 0.5 mm. In addition, a proper axial alignment allows the needle 11 to draw the substance in effectively even if the needle is bent.

The invention claimed is:

1. A method for manipulating toxic substances, the method comprising the steps of:
    by using anthropomorphic manipulation means, taking a container from a magazine for containers and transferring it to a dosage station, set in which is a doser having a longitudinal axis and provided with a needle; the container presenting a mouth closed by a perforable element;
    axially aligning the mouth with the needle via the manipulation means;
    approaching, via the manipulation means, the container to the doser in such a way that the needle perforates the perforable element and penetrates into the container to be able to inject a substance into the container or draw a substance therefrom;
    and being characterized in that the step of axially aligning the mouth with the needle comprises the steps of:
    acquiring a plurality of images of the needle from at least two distinct observation points and from at least two directions of framing lying on a plane orthogonal to said longitudinal axis, the directions of framing passing, each, through a respective one of said observation points in such a way as that an acute angle is formed between the directions of framing;
    processing said images for determining the position of the tip of the needle and the inclination of the needle with respect to said longitudinal axis; and
    actuating the manipulation means for correcting the position of the mouth according to the position of the tip of the needle and the inclination of the needle.

2. The method according to claim 1, wherein said step of acquiring a plurality of images of the needle envisages acquiring an image in digital format from each of said observation points; said step of image processing comprising the step of determining, from each image, first coordinates for a first point that defines said position of the tip of the needle with respect to a reference system defined on a plane orthogonal to said direction of framing.

3. The method according to claim 2, wherein said step of determining, from each image, first coordinates comprises the steps of:
    defining an area of interest of the image;
    carrying out a scan on each row of the area of interest to find a first edge compatible with a likely position of said tip of the needle; and
    determining the coordinates of the first edge found, the first coordinates being defined as a function of the coordinates of said first edge.

4. The method according to claim 3, wherein said step of determining, from each image, first coordinates comprises the steps of:
    in the case where a first non-compatible edge is found, increasing a contrast threshold of the image by a pre-set amount and repeating the scan of the image row by row; and
    in the case where a maximum value of the contrast threshold is reached without a first compatible edge having been found, producing an error message.

5. The method according to claim 2, wherein said step of image processing comprises the step of determining, from each image, second coordinates, with respect to said reference system, of a second point, through which said needle passes and which is located at a pre-set distance from said first point along said longitudinal axis; said step of determining the inclination of said needle with respect to the longitudinal axis envisaging determining said inclination as a function of said first coordinates and the second coordinates.

6. The method according to claim 5, wherein determining, from each image, second coordinates comprises the steps of:
    carrying out a scan of a row that is distant by a pre-set number of rows from said first point to find at least two second edges set at a distance apart compatible with the transverse dimensions of said needle; and calculating the second coordinates as coordinates of an intermediate point between the two second edges.

7. The method according to claim 6, wherein determining, from each image, second coordinates comprises the steps of:

in the case where no second edge is found or else the distance between the second edges is not compatible with the transverse dimensions of the needle, reducing a contrast threshold of the image and repeating the scan of said row;

in the case where a minimum value of the contrast threshold is reached without any second edge having been found or else without the distance between the second edges being compatible with the transverse dimensions of the needle, producing an error message.

8. The method according to claim 2, wherein said image in digital format is constituted by a matrix of pixels; determining, from each image, first coordinates comprising the steps of:

defining an area of interest of the image;

seeking, within each row of pixels of the area of interest in a pre-set search direction, a pair of pixels constituted by a first pixel and by a last pixel that have an intensity higher than a pre-set intensity threshold;

determining a shape of the tip of the needle on the basis of a linear interpolation of the position, in the area of interest, of the pairs of pixels found;

selecting, from among the pairs of pixels found, a first pair of pixels that remains substantially within said shape and that is positioned on a row of pixels compatible with a likely position of said tip of the needle; said first coordinates being defined as a function of first pair of pixels.

9. The method according to claim 8, wherein said tip of the needle faces downwards; said first pair of pixels being positioned, with respect to all the other said pairs of pixels within said shape, on the lowest row of pixels.

10. The method according to claim 8, wherein determining a shape of the tip of the needle comprises:

determining a first straight line and a second straight line via linear interpolation of the positions in the area of interest of the first pixels and, respectively, of the last pixels of all the pairs of pixels found; said shape being defined by said straight lines.

11. The method according to claim 10, wherein determining a shape of the tip of the needle comprises:

eliminating, from the pairs of pixels found, those pairs of pixels that fall outside of said shape and that are at a distance, along the respective said row of pixels, from said straight lines by a pre-set amount; and repeating the determination of the straight lines.

12. The method according to claim 5, wherein said image in digital format is constituted by a matrix of pixels; said step of image processing comprising the steps of:

defining, for each image, an area of interest of the image;

seeking, within each row of pixels of the area of interest in a pre-set search direction, a pair of pixels constituted by a first pixel and by a last pixel that have an intensity higher than a pre-set intensity threshold; and determining a first straight line and a second straight line, by linearly interpolating the positions in the area of interest of the first pixels and, respectively, of the last pixels of all the pairs of pixels found;

said step of determining, from each image, second coordinates comprising the steps of:

calculating a third straight line as vector sum of the directions identified by the first and second straight lines; and determining the second coordinates as a function of an intersection of the third straight line with a row of pixels that is distant by a pre-set number of rows from said first point.

13. A non-transient computer readable storage medium having encoded thereof a program comprising software code portions capable of implementing, when the computer program is run on a computer of a machine for manipulating toxic substances, the method according to claim 1.

14. A machine for manipulating toxic substances comprising:

a dosage station, set in which is a doser provided with a needle;

a magazine for storing containers, each of which has a respective mouth closed by a perforable element;

anthropomorphic manipulation means designed to pick up at least one container from the magazine and to transfer the container into the dosage station to a point corresponding to the doser; and control means designed to control the movements of the manipulation means;

the machine being characterized in that it comprises:

image-acquisition means for acquiring images of the needle; and processing means, which are connected to the control means for sending commands to the machine and to the image-acquisition means for receiving the images of the needle, and are configured for implementing the method according to claim 1.

15. The machine according to claim 14, wherein said image-acquisition means are mounted on said manipulation means.

16. The machine according to claim 14, wherein said manipulation means comprise an anthropomorphic robot, which comprises a gripping head designed to grip said container, and an articulated arm with six degrees of freedom designed to support said head; said image-acquisition means comprising a telecamera mounted in a fixed way on the head.

17. The machine according to claim 16, wherein said head comprises two jaws mobile along an axis of sliding with a movement of mutual approach and recession for gripping and, respectively, releasing said container; the telecamera comprising an optical axis and being mounted on said head with the optical axis perpendicular to a plane on which the axis of sliding lies.

18. The machine according to claim 16, wherein said telecamera is of a black-and-white type with fixed focus and comprises a video-composite output connected to a corresponding input of said processing means.

* * * * *

UNITED STATES PATENT AND TRADEMARK OFFICE
CERTIFICATE OF CORRECTION

| | | |
|---|---|---|
| PATENT NO. | : 8,404,492 B2 | Page 1 of 1 |
| APPLICATION NO. | : 12/516149 | |
| DATED | : March 26, 2013 | |
| INVENTOR(S) | : Baldassari et al. | |

It is certified that error appears in the above-identified patent and that said Letters Patent is hereby corrected as shown below:

On the Title Page, item [75] second listed inventor, please delete "Gabbarini" and insert --Gabbarrini--.

Signed and Sealed this
Eighteenth Day of November, 2014

Michelle K. Lee
*Deputy Director of the United States Patent and Trademark Office*